US008126058B2

(12) United States Patent  (10) Patent No.: US 8,126,058 B2
Tseng et al.  (45) Date of Patent: Feb. 28, 2012

(54) POWER AWARE METHOD AND APPARATUS OF VIDEO DECODER ON A MULTI-CORE PLATFORM

(75) Inventors: Shau-Yin Tseng, Hsinchu Hsien (TW); Chihhao Chang, Taoyuan (TW); Jia-Ming Chen, Nan-Tou Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 1518 days.

(21) Appl. No.: 11/555,689

(22) Filed: Nov. 2, 2006

(65) Prior Publication Data

US 2008/0025409 A1  Jan. 31, 2008

(30) Foreign Application Priority Data

Jul. 24, 2006 (TW) .............................. 95126915 A

(51) Int. Cl.
*H04N 11/02* (2006.01)
(52) U.S. Cl. .............................. 375/240.16; 375/240.18
(58) Field of Classification Search .............. 375/240.01
See application file for complete search history.

(56) References Cited

U.S. PATENT DOCUMENTS

| 5,812,860 | A | 9/1998 | Horden et al. |
| 6,944,229 | B2 * | 9/2005 | Son et al. ................. 375/240.25 |
| 2003/0118112 | A1 | 6/2003 | Son et al. ...................... 375/240 |
| 2006/0290776 | A1 * | 12/2006 | Rutten et al. ............... 348/14.09 |
| 2009/0013201 | A1 * | 1/2009 | He et al. ........................ 713/322 |

FOREIGN PATENT DOCUMENTS

| CN | 1739080 | 2/2006 |
| JP | 08-190535 | 7/1996 |
| JP | 2004-153553 | 5/2004 |

OTHER PUBLICATIONS

Lee,S.; "Low-Power Video Decoding on a Variable Voltage Processor for Mobile Multimedia Applications"; Oct. 2005; ETRI Journal; vol. 27; No. 5; pp. 504-510.*
Tan, Y. et al.;"Workload Prediction and Dynamic Voltage Scaling for MPEG Decoding"; Jan. 24-27, 2006; South Pacific Conference on Design Automation; pp. 911-916.*
Horowitz, M. et al.; "H.264/AVC Baseline Profile Decoder Complexity Analysis"; Jul. 2003; IEEE Transactions on Circuits and Systems for Video Technology; vol. 13; No. 7; pp. 704-716.*
Song, J. et al.; "A Low Power Open Multimedia Application Platform for 3G Wireless"; 2003; Proceedings of IEEE International SOC Conference; pp. 377-380.*
S. Lee, "Low-Power Video Decoding on a Variable Voltage Processor for Mobile Multimedia Applications", ETRI Journal, vol. 27, No. 5, pp. 504-510, Oct. 2005, Dec. 1, 2003.

(Continued)

*Primary Examiner* — Christopher S Kelley
*Assistant Examiner* — Maria Vazquez Colon

(57) ABSTRACT

Disclosed is a power aware method and apparatus of video decoder on a multi-core platform. The power aware apparatus comprises a power management unit, and a processor unit having an entropy decoder and a decoder. The processor unit has at least one voltage and at least one frequency. One processor of the multi-core platform performs the entropy decoding for a frame, collects the entropy decoded information, and computes the decompressing time. Based on the computed decompressing time, the processor sets up the voltage and frequency for other or all processors to reduce power consumption for video decoders.

12 Claims, 14 Drawing Sheets

OTHER PUBLICATIONS

D. Son, C. Yu, and H.N.Kim, "Dynamic Voltage Scaling on MPEG Decoding", in ICPADS, 2001, pp. 633-640.

Power Aware H.264/AVC Video Player on PAC Dual-Core SoC Platform Jia-Ming Chen, Chih-Hao Chang, Shau-Yin Tseng, Jenq-Kuen Lee, and Wie-Kuan Shih Department of Computer Science, National Tsing Hua University, Hsinchu, Taiwan, 2006.

* cited by examiner $$T = \left( \begin{bmatrix} C_{00} & C_{01} & C_{02} & C_{03} \\ C_{10} & C_{11} & C_{12} & C_{13} \\ C_{20} & C_{21} & C_{22} & C_{23} \\ C_{30} & C_{31} & C_{32} & C_{33} \end{bmatrix} \cdot S \right) << (QP/6)$$

FIG. 4A (Prior Art)

$$T = \left( \begin{bmatrix} C_{00} & C_{01} & C_{02} & C_{03} \\ C_{10} & C_{11} & C_{12} & C_{13} \\ C_{20} & C_{21} & C_{22} & C_{23} \\ C_{30} & C_{31} & C_{32} & C_{33} \end{bmatrix} \cdot S \right) << (QP/6-2)$$

FIG. 4B (Prior Art)

$$T = \left( \begin{bmatrix} C_{00} & C_{01} & C_{02} & C_{03} \\ C_{10} & C_{11} & C_{12} & C_{13} \\ C_{20} & C_{21} & C_{22} & C_{23} \\ C_{30} & C_{31} & C_{32} & C_{33} \end{bmatrix} \cdot S + 2^{1-QP/6} \right) << (2-QP/6)$$

FIG. 4C (Prior Art)

$$T = \left( \begin{bmatrix} C_{00} & C_{01} \\ C_{10} & C_{11} \end{bmatrix} \cdot S \right) << (QP/6-1)$$

FIG. 4D (Prior Art)

$$T = \left( \begin{bmatrix} C_{00} & C_{01} \\ C_{10} & C_{11} \end{bmatrix} \cdot S \right) << 1$$

$$X = \begin{bmatrix} 1 & 1 & 1 & 1/2 \\ 1 & 1/2 & -1 & -1 \\ 1 & -1/2 & -1 & 1 \\ 1 & -1 & 1 & -1/2 \end{bmatrix} \begin{bmatrix} y_{00} & y_{01} & y_{02} & y_{03} \\ y_{10} & y_{11} & y_{12} & y_{13} \\ y_{20} & y_{21} & y_{22} & y_{23} \\ y_{30} & y_{31} & y_{32} & y_{33} \end{bmatrix} \begin{bmatrix} 1 & 1 & 1 & 1 \\ 1 & 1/2 & -1/2 & -1 \\ 1 & -1 & -1 & 1 \\ 1/2 & -1 & 1 & -1/2 \end{bmatrix}$$

FIG.5B (Prior Art)

$$X = \begin{bmatrix} 1 & 1 & 1 & 1 \\ 1 & 1 & -1 & -1 \\ 1 & -1 & -1 & 1 \\ 1 & -1 & 1 & -1 \end{bmatrix} \begin{bmatrix} y_{00} & y_{01} & y_{02} & y_{03} \\ y_{10} & y_{11} & y_{12} & y_{13} \\ y_{20} & y_{21} & y_{22} & y_{23} \\ y_{30} & y_{31} & y_{32} & y_{33} \end{bmatrix} \begin{bmatrix} 1 & 1 & 1 & 1 \\ 1 & 1 & -1 & -1 \\ 1 & -1 & -1 & 1 \\ 1 & -1 & 1 & -1 \end{bmatrix}$$

FIG.5C (Prior Art)

$$X = \begin{bmatrix} 1 & 1 \\ 1 & -1 \end{bmatrix} \begin{bmatrix} y_{00} & y_{01} \\ y_{10} & y_{11} \end{bmatrix} \begin{bmatrix} 1 & 1 \\ 1 & -1 \end{bmatrix}$$

| | |
|---|---|
| BS = 4 | p or q is the I-type block, and on the boundary line |
| BS = 3 | p and q are I-type block |
| BS = 2 | p and q are not I-type block, whether CBP bit of p and q is zero |
| BS = 1 | p and q are not I-type block, CPB bit of p and q are all zero, p and q refer to different frames, or p and q refers to different multiple frames, or motion vector difference of p and q is less than one integer dot. |
| BS = 0 | others |

FIG. 7 (Prior Art)

| No. | Cycle | Percentage |
|---|---|---|
| 1 | 9946047 | 65% |
| 2 | 10672057 | 70% |
| 3 | 9545622 | 63% |
| 4 | 9662774 | 64% |
| 5 | 9825186 | 65% |
| 6 | 10182258 | 67% |
| 7 | 10638321 | 70% |
| 8 | 8206291 | 54% |
| 9 | 8994506 | 59% |
| 10 | 8445091 | 56% |
| 11 | 8358646 | 55% |
| 12 | 10743043 | 71% |
| 13 | 7002097 | 46% |
| 14 | 7632951 | 50% |
| 15 | 7995602 | 53% |

FIG. 12

| Power Mode | Operating Condition | | Power Consumption |
|---|---|---|---|
| | Frequency (Mhz) | Voltage (Volt) | |
| Mode 1 : DSP_active-1_mode | 228 | 1.2 | 100% |
| Mode 2 : DSP_active-2_mode | 152 | 1.0 | 46% |
| Mode 3 : DSP_active-3_mode | 114 | 0.9 | 28% |
| Mode 4 : DSP_active-4_mode | 0 | 1.2 | <1% |
| Mode 5 : DSP_active-5_mode | 0 | 0.9 | <1% |
| Mode 6 : DSP_active-6_mode | 0 | 0 | <0.1% |

FIG. 13A

| No. | Cycle | Percentage | Power Mode |
|---|---|---|---|
| 1 | 9968322 | 98% | Mode 2 |
| 2 | 10446130 | 70% | Mode 1 |
| 3 | 9571075 | 94% | Mode 2 |
| 4 | 9694119 | 95% | Mode 2 |
| 5 | 9855625 | 97% | Mode 2 |
| 6 | 10203299 | 67% | Mode 1 |
| 7 | 10425238 | 70% | Mode 1 |
| 8 | 8231580 | 81% | Mode 2 |
| 9 | 9011232 | 89% | Mode 2 |
| 10 | 8478145 | 83% | Mode 2 |
| 11 | 8388869 | 82% | Mode 2 |
| 12 | 10510721 | 71% | Mode 1 |
| 13 | 7025034 | 92% | Mode 3 |
| 14 | 7652091 | 75% | Mode 2 |
| 15 | 8023055 | 79% | Mode 2 |

FIG. 13B

POWER AWARE METHOD AND APPARATUS OF VIDEO DECODER ON A MULTI-CORE PLATFORM

FIELD OF THE INVENTION

The present invention generally relates to a power aware method and apparatus of a video decoder on a multi-core platform.

BACKGROUND OF THE INVENTION

The continuous breakthrough with high density nano fabrication technology and the system-on chip (SoC) design enable a single chip to accommodate a plurality of processing units. The demands for the consumer digital products are the focus of the electronic industry. The popular products in demands include hand-held devices, such as mobile phone, digital camera, portable media player (PMP), and home theater, such as LCD TV, DVD, PVR, RG, and so on. The types of data that need to be processed on all these electronic devices are increasing, including video, audio, and text.

In response to the complex processing demands, the multi-core platform is considered as a promising solution. The multi-core platform not only uses a microprocessor with a reduced instruction set computing (RISC) based micro processing unit (MPU), such as ARM, MIPS, and PowerPC, and a digital signal processing (DSP) unit for processing signals.

Each of these processing units can be an individual multi-core platform, including multi-core RISC-based network processor, such as Broadcom, Freescale, and PMC-Sierra, or multimedia processing with RISC, DSP and even reconfigurable accelerator, such as OMAP(TI), i.Smart (Freescale), Vision (Agere), and PAC(ITRI).

To meet the ever-growing multimedia application, the dual-core processor with a RISC-based MPU and a DSP is gaining popularity. The RISC-based microprocessor, such as ARM, is responsible for the operating system (OS), man-machine interface (MMI) and other routine tasks, while the DSP processor is for executing complex mathematical computing, such as audio coding/decoding, video decoding, and so on.

In other words, the RISC-based microprocessor of the dual core platform performs tasks different from the DSP. The RISC-enhanced DSP may be powerful in DSP, but not in the general RISC processing. The DSP is optimized for real-time signal processing, which may require less power consumption and computing cost than the RISC processing. In addition, the pipeline of the DSP, although can perform complex signal processing efficiently, is not suitable for simple control. Therefore, the DSP processor is not efficient for general-purpose control processor.

The multimedia application on portable devices, such as PDA and smart phone, is common. As the portable devices are battery-powered, it is important to prolong the battery life. However, the video signal processing usually is complex and consumes a large amount of power. The advanced video compression standard H.264/AVC (advance video coding) reports that a large difference exists in the computing complexity in reconstructing a frame. FIG. 1 shows the number of cycles required for decoding a QCIF image, with the minimum number of cycles 1,020,140, and the maximum number of cycles 4,002,744. The average number of cycles is 2,446,444, and the standard deviation is as high as 710,647 cycles.

In general, the microprocessor is designed for the worse scenario. Therefore, the microprocessor usually has a large amount of idle time. When a microprocessor is idling, the operating voltage or frequency can be reduced to save power consumption.

FIG. 2 shows a decoding flowchart 200 of H.264/AVC. The coded bitstream, after entropy decoding, is decoded as two types of data. The first type of data is the syntax elements, including block file header data, motion vector, and so on, and the second type of data is quantized residual coefficient.

H.264 uses power Columbus code to decode the first type of data, and uses context adaptive variable length codes (CAVLC) to decode the second type of data. CAVLC decoding includes the following steps 101-106, with each step using a different code table.

Step 101: decoding the total number of non-zero coefficients TC and the number of $\pm 1$ T1$s$. The range of TC is 0-16, and the range of T1$s$ is 0-3. This step determines the lookup table based on the nC, where nC is the average of the numbers of non-zero coefficients in the upper part and the left part of the current block that is already decoded.

Step 102: based on T1$s$, decoding the sign. Use 0 to represent the positive sign, and use 1 to indicate the negative sign.

Step 103: based on TC, decoding non-zero coefficient level. The look up table used in this step is determined by the previous decoded non-zero coefficient.

Step 104: decoding the total number of zeros preceding the non-zero coefficients. The lookup table used in this step is determined based on TC.

Step 105: decoding the number of zeros preceding each non-zero coefficient. The lookup table used in this step is determined by the number of zeros preceding the non-zero coefficient.

Step 106: recovering the 16 zig-zag sequenced coefficients, based on the values of the previous steps.

FIG. 3 shows the quantized residual coefficients generated after entropy decoding 201. The quantized residual coefficients include the coefficients of 27 small blocks. With the exception of $16^{th}$ and $17^{th}$ small blocks 302 being 2×2, the rest of the small blocks are all 4×4. Also, only in the Intra_16×16 coding mode, the −1th small block 301 will be generated after the entropy decoding.

In H.264/AVC decoding process, inverse quantization 202 is the quantized residual coefficient matrix multiplied by the corresponding quantized matrix. The computation equation is shown in FIGS. 4A-4E, where matrix $[c_{ij}]$ is the quantized residual coefficient matrix, S is determined by quantization parameter QP divided by 6, and T is the matrix after the inverse quantization, called transform residual block coefficient matrix.

Inverse quantization 202 performs the 4×4 inverse quantization computing on the −1th small block 301, performs the 2×2 DC inverse quantization computing on the $16^{th}$ and $17^{th}$ small blocks 302, and performs the 4×4 DC inverse quantization computing rest of small blocks 303.

The transform residual coefficients after the inverse quantization are shown in FIG. 3. The transform residual coefficients include coefficients of 27 small blocks. With the exception of $16^{th}$ and $17^{th}$ small blocks 302 being 2×2, the rest of the small blocks are all 4×4. Also, only in the Intra_16×16 coding mode, the −1th small block 301 will be generated after the entropy decoding.

In the H.264/AVC decoding process, the computing equation of inverse transform 203 is shown in FIGS. 5A-5C, where matrix $[y_{ij}]$ is the transform residual coefficient matrix, and X is the residual coefficient matrix. Inverse transform 203 performs the 4×4 inverse transform computing on the −1th small block 301, performs the 2×2 DC inverse transform computing on the 16th and 17th small blocks 302, and performs the 4×4 DC inverse transform computing on the rest of small blocks 303.

In the H.264/AVC decoding process, motion compensation (MC) 204 is the sum of the inverse transform output and the predictor found in intra-frame prediction 207 or inter-frame prediction 208.

Intra-frame prediction 207 provides intra_4×4 and intra_16×16 types. Intra-4×4 is to find the predictor using the luma 4×4 small block as the unit. There are 9 prediction directions for finding predictor. Intra_16×16 is similar to intra_4×4, but using luma 16×16 small block as the unit, and has 4 prediction directions for finding predictor. The intra-frame prediction technique also provides 4 intra-frame prediction directions for chroma, which uses chroma 8×8 block as the unit.

Inter-frame 208 uses the motion vector 206 to generate prediction block in the reference frame. The unit of motion vector 206 can be an integer dot, ½ dot, or ¼ dot. As the ½ dot and ¼ dot information is not recorded during storing the frame, the ½ dot and ¼ dot information must be computed using an integer dot.

The type of intra-frame prediction 207 can be obtained from the first type of data after entropy decoding, and the motion vector of inter-frame prediction 208 can be computed from the first type of data after entropy decoding.

In the H.264/AVC decoding process, the operation of deblocking filter 205 is shown in FIG. 6A. The four vertical boundary lines a-d and the four horizontal boundary lines e-h are used to divide a 16×16 luma block into 16 4×4 luma sub-blocks. Similarly, two vertical boundary lines i, j and two horizontal boundary lines k, l can be used to divide an 8×8 chroma block into 4 4×4 chroma sub-blocks, as shown in FIG. 6B.

When executing deblocking filtering on luma blocks, the execution order is to process four vertical boundary lines a-d, and then four horizontal lines e-h. Similarly, when executing deblocking filtering on chroma blocks, the execution order is to process vertical boundary lines i, j, and then two horizontal boundary lines k, l.

During the deblocking filtering, the boundary strength (BS) is used to determine whether the filtering is required. When BS=1, 2, 3, 4, the filtering is performed. When BS=0, no filtering is performed. The BS is determined by the conditions in FIG. 7. In summary, the conventional decoding process is shown in FIG. 8.

U.S. Pat. No. 6,944,229 disclosed two methods of dynamically adjusting the voltage frequency of the processor. The first method is DVS-Dm, and the second is DVS-PD. DVS-DM is to use the previous load record to adjust the voltage frequency. By categorizing the decoding time into delay state and drop state, the delay state implies the CPU has sufficient time to decode. The greater the delay is, the more time CPU has for decoding. A delay of zero implies that the CPU has just sufficient time to decode. A drop state implies that the CPU has no time to decode and must drop the current frame. When decoding I-type and P-type frames, the voltage frequency must be adjusted to the highest, and when decoding B-type frame, the voltage frequency is tuned high. When being in the delay state and the delay is greater than 100, the voltage frequency is tuned down.

DVS-PD uses the previous load record and the estimation of decoding time to adjust the voltage frequency. Because the time required for decoding an I-type, P-type and B-type frame is different, the decoding time can be estimated by the frame type and the load record of the same type frame. The voltage frequency can be tuned similar to the DVS-DM.

SUMMARY OF THE INVENTION

The present invention provides a power aware method and apparatus of video decoder on a multi-core platform. Because it is a multi-core platform, one of the processor can execute the entropy decoding of a frame, collect the information after the entropy decoding to estimate the frequency required for this frame, and tune the voltage and frequency of some or all of the other processors to reduce the power consumption.

The present invention uses nC to determine the lookup table to use. The nC is the average of the total numbers of the non-zero coefficients in the upper and the left part of the current block that is decoded. The number of zero quantized residual coefficients after entropy decoding can thus be obtained. The decoding time, including inverse quantization and inverse transform time, motion compensation time and deblocking filter time, can be estimated. The operating voltage and frequency can be tuned by estimating the decoding time.

The power aware apparatus of video decoder on a multi-core platform includes a processor unit and a power management unit. The processor unit has at least an operating voltage and at least an operating frequency.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 4A shows a 4×4 inverse quantization equation.

FIG. 4B shows a 4×4 DC inverse quantization equation (QP>=12).

FIG. 4C shows a 4×4 DC inverse quantization equation (QP<12).

FIG. 4D shows a 2×2 DC inverse quantization equation (QP>=6).

FIG. 4E shows a 2×2 DC inverse quantization equation (QP<6).

FIG. 5A shows a 4×4 inverse transform equation.

FIG. 5B shows a 4×4 DC inverse transform equation.

FIG. 5C shows a 2×2 inverse quantization equation.

FIG. 7 shows the conditions of boundary strength.

FIG. 12 shows the required cycles and percentage of the decoding time for each frame to 1/15 second.

FIG. 13A shows the relationship between the power consumption and the six modes of DSP processor.

FIG. 13B shows the required cycles and the percentage of the decoding time to 1/15 seconds when using the present invention on a DSP processor.

DETAILED DESCRIPTION OF THE PREFERRED EMBODIMENTS

The present invention analyzes the H.264/AVC decoding process, and takes advantage of the fact that some computing can be omitted during the decoding process when quantized residual coefficients are all zero. For example, (1) inverse quantization and inverse transform can be omitted; (2) the motion compensation requires only duplicating, instead of computing, when the unit of motion vector is an integer; and (3) when BS=0, deblocking filtering is not required.

The nC is used to determine the lookup table to use. The nC is the average of the total numbers of the non-zero coefficients in the upper and the left part of the current block that is decoded. The number of zero quantized residual coefficients after entropy decoding can thus be obtained.

Figure 1:
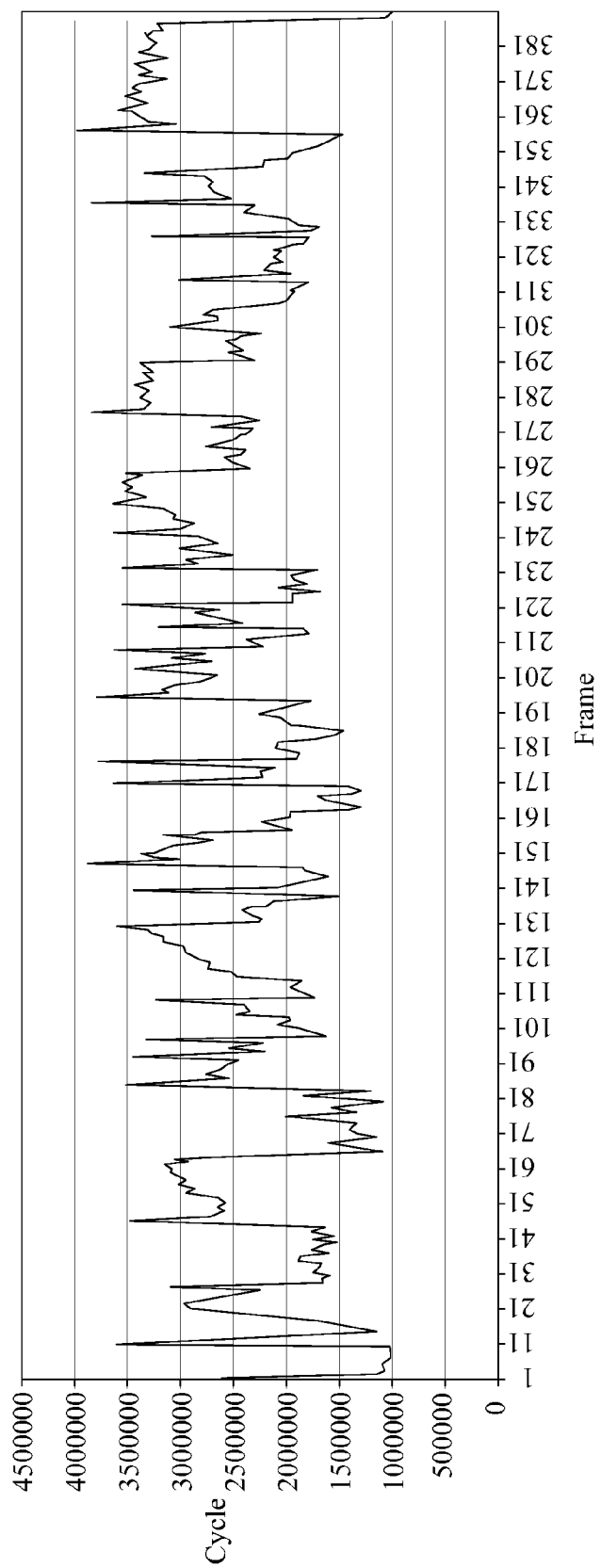
FIG. 1 shows the required cycles when H.264/AVC decoding QCIF frame.
Figure 2:
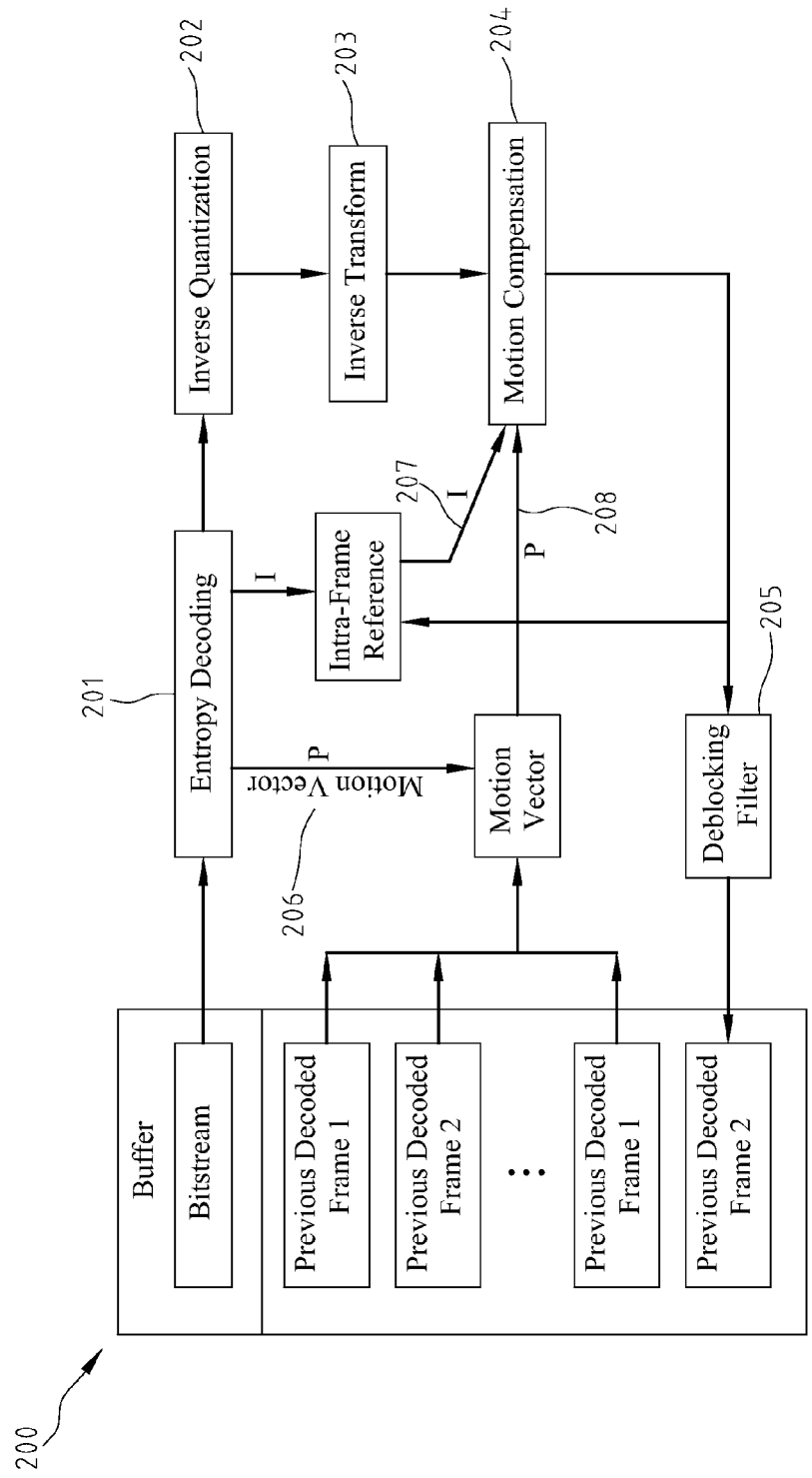
FIG. 2 shows the decoding flowchart of H.264/AVC.
Figure 3:
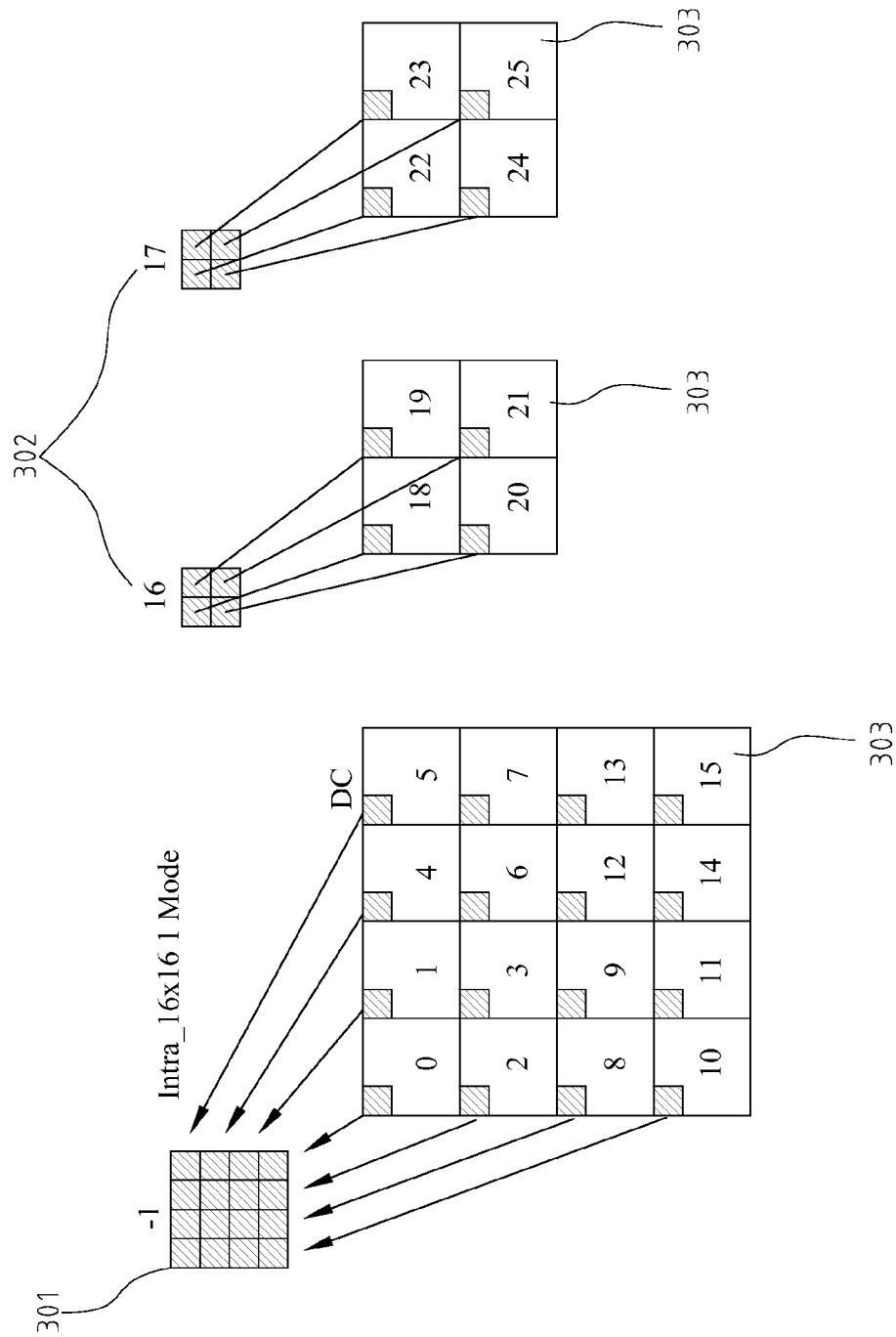
FIG. 3 shows the transform residual coefficients after inverse quantization.
Figure 6A:
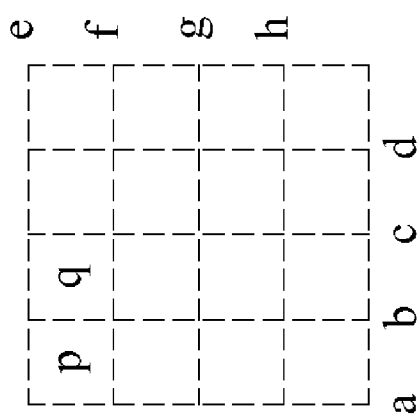
FIG. 6A shows a 4×4 deblocking filter process.
Figure 6B:
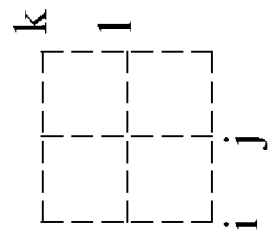
FIG. 6B shows a 2×2 deblocking filter process.
Figure 8:
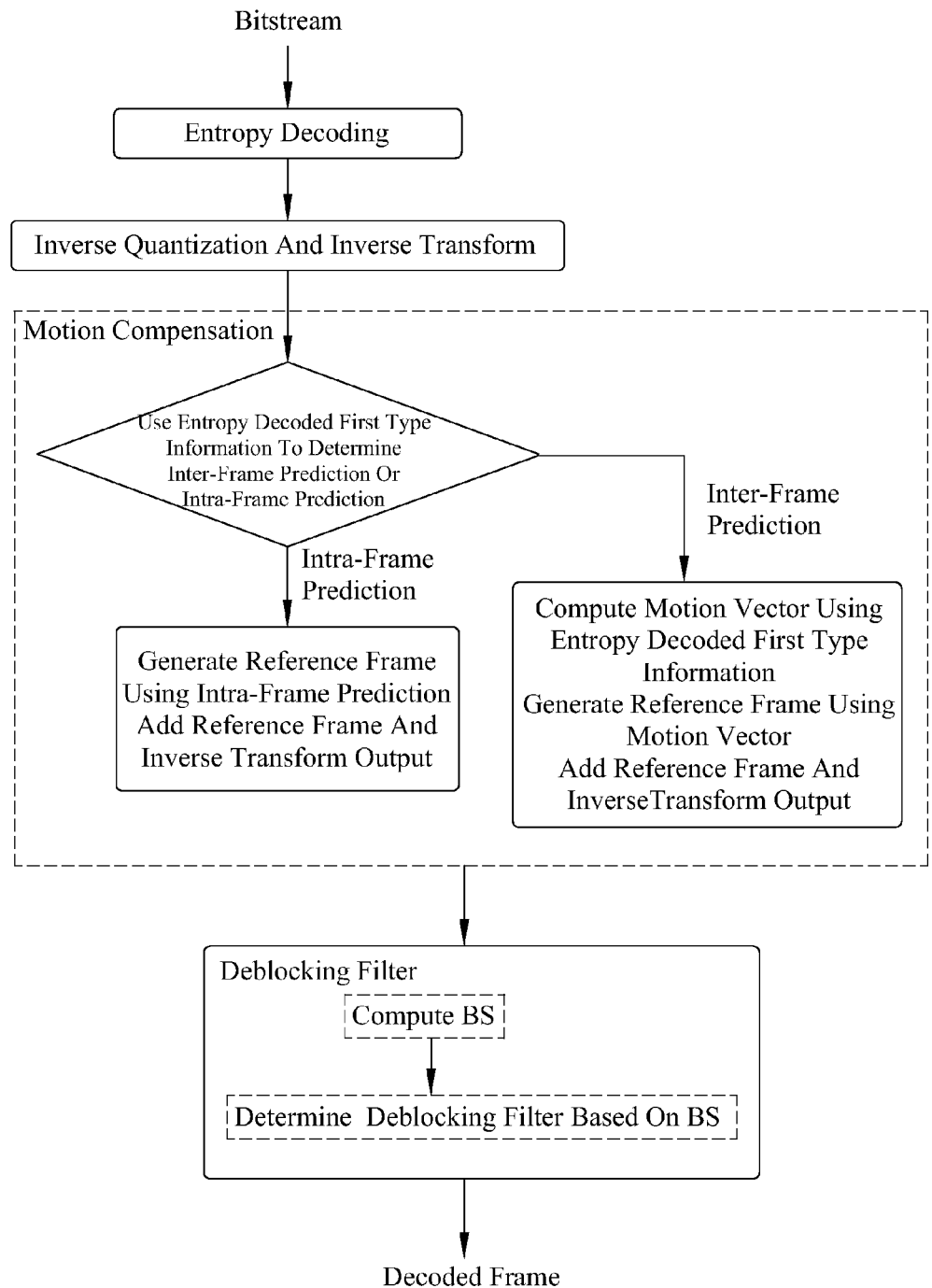
FIG. 8 shows the flowchart of a conventional decoding process.
Figure 9:
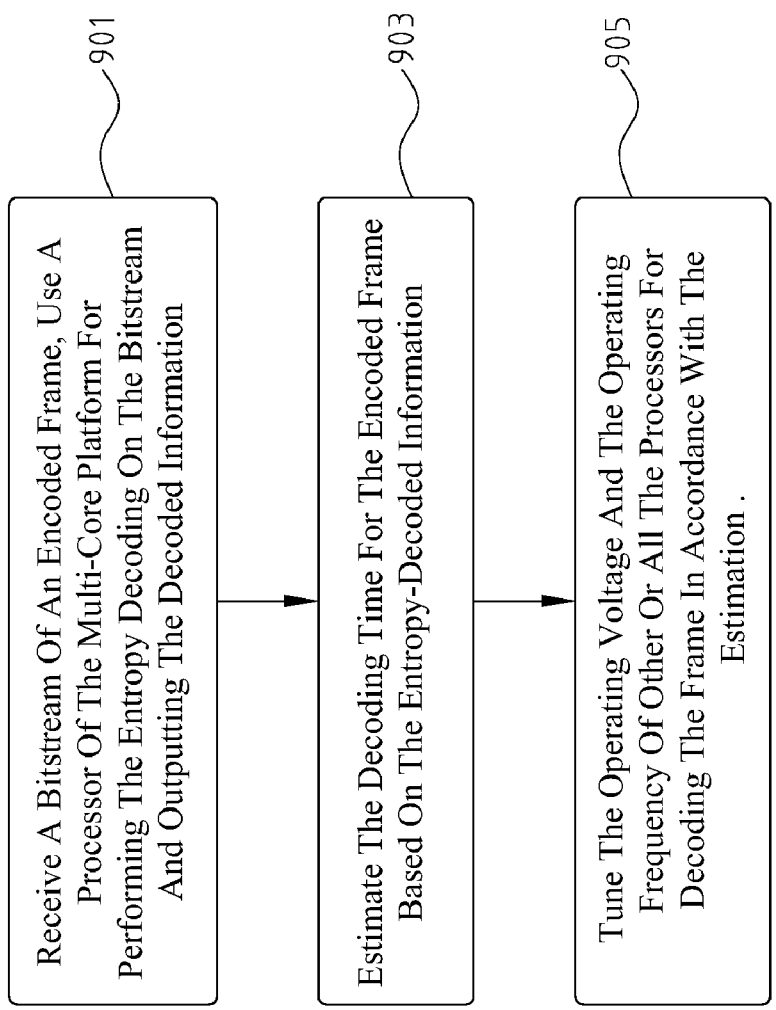
FIG. 9 shows the flowchart of the power aware method of video decoder on a multi-core platform of the present invention.

The required operating frequency can be estimated by collecting the information after the entropy decoding. The estimation result can then be used for tuning the operating voltage and the operating frequency of other or all the processors for processing the next frame. FIG. 9 shows a flowchart of the power aware method of the present invention. The multi-core platform includes at least a processor.

Refer to FIG. 9. Step 901 is to receive a bitstream of an encoded frame and to use a processor of the multi-core platform for performing the entropy decoding on the bitstream and outputting the decoded information. The entropy-decoded information includes at least the number of the all-zero quantized residual coefficients. Step 903 is to estimate the decoding time for the encoded frame based on the entropy-decoded information. Step 905 is to tune the operating voltage and the operating frequency of other or all the processors for decoding the frame in accordance with the estimation.

Because there is a linear relationship between the entropy decoding time and the number of bits in the bitstream, it only needs to know how may bits in a bitstream to estimate the entropy decoding time in step 901.

To save power consumption, it is necessary to correctly tune the operating voltage and frequency of the processor to decode the frame. The following describes how to correctly estimate the required decoding time.

The estimation of decoding time in step 903 includes the estimation of inverse quantization and inverse transform time $ET_{IQ\&IT}$, motion compensation time $ET_{MC}$, and deblocking filter time $ET_{DF}$. That is, the estimated decoding time equals to $ET_{IQ\&IT}+ET_{MC}+ET_{DF}$.

The estimation of inverse quantization and inverse transform time $ET_{IQ\&IT}$ is described as follows. Basically, the inverse quantization and inverse transform can be regarded as the computing of 24 4×4 small blocks. When the coefficients of a 4×4 small block are all-zero, the inverse quantization and inverse transform can be omitted as the result is always 0. Therefore, it only needs to know the number of non-zero quantized residual coefficients of the entropy-decoded 24 4×4 small blocks in order to estimate the inverse quantization and inverse transform time. In the first step (step 101) of CAVLD, nC determines the lookup table to be used, where nC is the average of the total numbers of the non-zero coefficients in the upper and the left part of the current block that is decoded. The required information can be collected from nC.

The estimation of motion compensation time $ET_{MC}$ is described as follows. Motion compensation includes the addition of the predicator from the intra-frame prediction or inter-frame prediction and the output of inverse transform. Therefore, the motion compensation execution time includes the predictor generation time and the addition time.

As aforementioned, H.264/AVC provides two types of intra-frame predictions for luma, intra_4×4 and intra_16×16, and provides four types of intra-frame predictions for chroma. The chroma uses chroma 8×8 as the unit. The inter-frame prediction uses motion vector in the reference frame to generate prediction block. The unit of motion vector can be an integer dot, ½ dot, or ¼ dot. When the unit of motion vector is an integer dot, the motion compensation does not require to compute, but only requires to duplicate. Because there is no ½ dot and ¼ dot data stored in storing the frame, the ½ dot and ¼ dot data are computed by the integer dot. Therefore, the compensation for motion vector of integer dot, ½ dot and ¼ dot are different. The type of intra-frame prediction can be obtained from the first type data after entropy decoding, and the motion vector of the inter-frame prediction can also be obtained from the first type data after entropy decoding.

The estimation of deblocking filter execution time $ET_{DF}$ is as follows. Basically, the execution of deblocking filter can be seen as the deblocking filter computing of 32 4×4 small blocks in accordance with the BS value. When BS=0, no deblocking filter computing is performed. When BS=1, 2 or 3, the estimation equation is different from the equation when BS=4.

Figure 10:
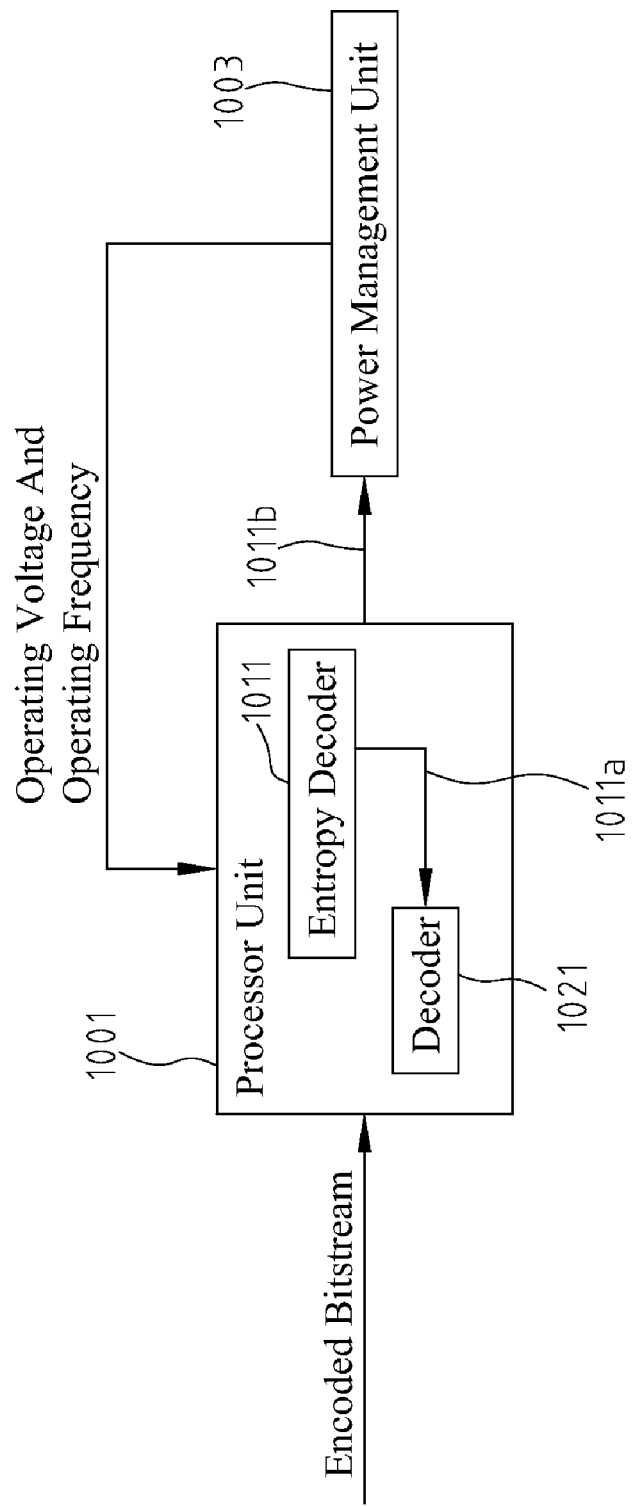
FIG. 10 shows a schematic view of the power aware apparatus of video decoder on a multi-core platform of the present invention.

FIG. 10 shows a schematic view of the power aware apparatus of the present invention. As shown in FIG. 10, a power aware apparatus includes a processor unit 1001 and a power management unit 1003. Processor unit 1001 at least includes an operating voltage and an operating frequency. Processor unit 1001 also includes an entropy decoder 1011 and a decoder 1021. Processor unit 1001 receives a bitstream of a frame. Entropy decoder 1011 performs entropy decoding on the bit stream and outputs the entropy decoded information 1011*a*. Entropy decoded information 1011*a* at least includes the number of the information 1011*b* of all-zero quantized residual coefficients. Based on information 1011*b*, power management unit 1003 estimates the decoding time of the encoded frame, and tune the operating voltage and frequency of processor unit 1001. Based on the tuning, decoder 1021 executes the decoding of the frame.

Therefore, the present invention tunes the operating voltage and frequency for processor unit 1001 when decoding each frame for saving power.

Decoder 1021 uses the entropy decoded information 1011*a* to decode each frame, including inverse quantization and inverse transform, motion compensation and deblocking filtering.

Without the loss of generality, the following embodiments use dual-core and unit-core platforms for explanation.

In the first embodiment, the multi-core platform is a dual-core platform, including a first processor and a second processor. The first processor, such as a microprocessor, receives a bitstream of a frame, executes the entropy decoding and estimates the decoding time, and then tunes the operating voltage and frequency of the second processor, such as DSP processor. The second processor decodes the encoded frame, including performing inverse quantization and inverse transform, motion compensation, and deblocking filter.

Figure 11:
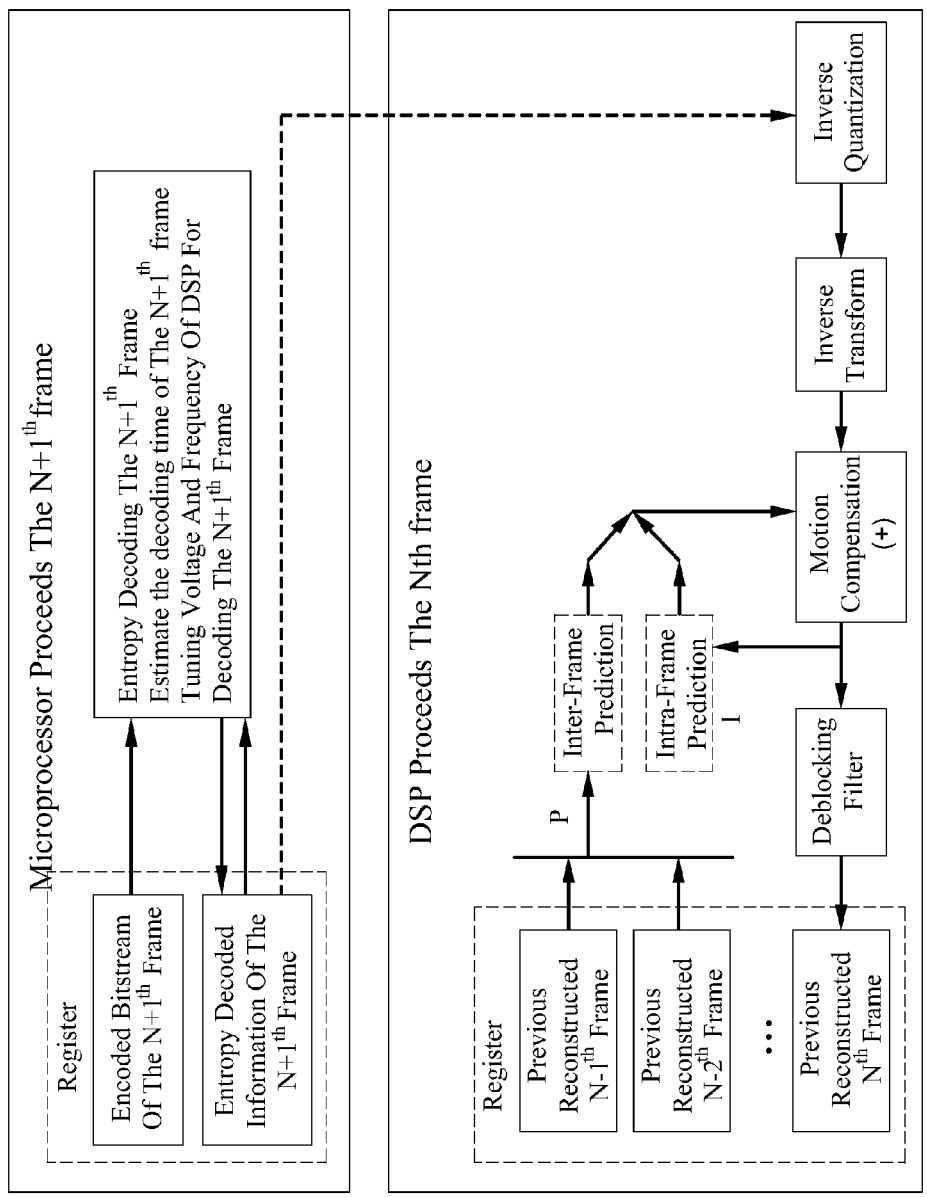
FIG. 11 shows a flowchart of the application of the present invention on a dual-core platform.

FIG. 11 shows a schematic view of the embodiment of the present invention applied to a dual-core platform. The second processor (DSP processor) executes the decoding of the Nth frame, including inverse quantization and inverse transform, motion compensation, and deblocking filter, and the first processor (microprocessor) executes the entropy decoding, decoding time estimation, and computing the required operating voltage and frequency for the N+1$^{th}$ frame.

Because the decoding of a frame takes more time, when the second processor decodes the N$^{th}$ frame, the first processor can execute its tasks on the N+1$^{th}$, N+2$^{th}$, . . . , frames to save power.

In the second embodiment, the multi-core platform is a uni-core platform, for example, including only a DSP processor and a microprocessor. The processor first executes the entropy decoding, the decoding-time estimation, and the computation of the required operating voltage and frequency for the N+1$^{th}$ frame. It then executes the inverse quantization, the inverse transform, the motion compensation, and the deblocking filter for the N$^{th}$ frame. At the end of executing the N$^{th}$ frame, the processor sets up the operating voltage and frequency for decoding the N+1$^{th}$ frame. In other words, the uni-core platform is a special case of FIG. 11 where the first processor and the second processor are the same one.

The simulation is conducted to compare the power consumption of the method and apparatus of the present invention and the conventional method. The multi-core platform is a dual-core platform, and each frame must be decoded in 1/15 seconds.

FIG. 12 shows the required cycles for decoding each frame and the percentage of the decoding time within 1/15 seconds of each frame when using the conventional fixed voltage and frequency method. The fixed voltage and frequency are 1.2V and 228 MHz, respectively.

Assume the DSP consumes a unit of power to execute 1/15 second decoding, and consumes no power at the remaining time. The power consumption in FIG. 12 is equal to 1×9.08+0×5.92=9.08. Where 9.08 is the sum of the percentage of each frame of 1/15 second decoding of FIG. 11, and 5.92 is the sum of the remaining time percentage after the 1/15 second decoding.

If the required cycles of decoding each frame can be known in advance, the voltage and frequency can be tuned to save power. According to the present invention, FIG. 13A shows the relationship between the power consumption and the voltage/frequency of the six power modes (mode 1-mode 6) of DSP. FIG. 13B shows that of the 1/15 second decoding when decoding each frame using dynamic tuning of voltage and frequency. On the other hand, the power consumption in FIG. 13B is equal to 1×(2.78)+(1.0/1.2)$^2$(152/228)×(8.73)+(0.8/1.2)$^2$(114/228)×(0.92)=2.78+4.04+0.26=7.08 units.

As shown, the present invention consumes 22% less power than the conventional fixed voltage and frequency when using a DSP processor.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power aware method of video decoder on a multi-core platform, said multi-core platform at least having a processor, said method comprising the steps of:

receiving a bitstream of an encoded frame, said processor of said multi-core platform performing entropy decoding on said bitstream and outputting entropy decoded information including at least a number of all-zero quantized residual coefficients of said bitstream;

estimating decoding time required for decoding said encoded frame including time for inverse quantization and inverse transform, time for motion compensation, and time for deblocking filtering, based on said entropy decoded information; and tuning an operating voltage and an operating frequency of said processor of said multi-core platform based on said estimated decoding time for decoding said encoded frame;

wherein said time for motion compensation is obtained by computing the number of all-zero quantized residual coefficients, time for only duplication but no computing required when a motion vector is an integer dot, time for predictor generation of intra-frame or inter-frame prediction and time for generating output of inverse transform.

2. The method as claimed in claim 1, wherein said time for inverse quantization and inverse transform is obtained by computing a number of non-zero quantized residual coefficients of inverse quantization and inverse transform through said number of all-zero quantized residual coefficients.

3. The method as claimed in claim 1, wherein said time for deblocking filtering is obtained by computing the number of all-zero quantized residual coefficients and the time that the deblocking filter is omitted when boundary strength equals 0.

4. The method as claimed in claim 1, wherein said multi-core platform at least includes two processors, where a first processor is for entropy decoding, estimating decoding time, and tuning the operating voltage and frequency of all the other processors for decoding.

5. The method as claimed in claim 4, wherein at least one other processor decodes N$^{th}$ encoded frame when said first processor performs entropy decoding, estimating decoding time, and tuning the operating voltage and frequency of all the other processors for N+1$^{th}$, N+2$^{th}$, or more frames.

6. The method as claimed in claim 1, wherein said multi-core platform includes at least two processors, and a processor of said multi-core platform performs entropy decoding and estimating decoding time for N+1$^{th}$ frame, and then decoding, including inverse quantization, inverse transform, motion compensation and deblocking filter on N$^{th}$ frame, and finally tuning the operating voltage and frequency of all the other processors for N+1$^{th}$ frame.

7. A power aware apparatus of video decoder on a multi-core platform, comprising:

a processor unit having at least an operating voltage and an operating frequency, said processor unit further including an entropy decoder and a decoder, for receiving a bitstream of an encoded frame, said entropy decoder performing entropy decoding on said bitstream and outputting entropy decoded information including at least a number of all-zero quantized residual coefficients; and a power management unit, for estimating decoding time for said encoded frame including time for inverse quantization and inverse transform, time for motion compensation, and time for deblocking filtering, and tuning said operating voltage and said operating frequency of said processor unit for decoding said encoded frame in accordance with said number of all-zero quantized residual coefficients, wherein said time for motion compensation is obtained by computing the number of all-zero quantized residual coefficients, time for only duplication but no computing required when a motion vector is an integer dot, time for predictor generation of intra-frame or inter-frame prediction and time for generating output of inverse transform.

8. The apparatus as claimed in claim 7, wherein said processor unit is a dual-core processor.

9. The apparatus as claimed in claim 8, wherein said dual-core processor includes a microprocessor and a digital signal processor.

10. The apparatus as claimed in claim 7, wherein said processor unit is a uni-core processor.

11. The apparatus as claimed in claim 10, wherein said uni-core processor is a micro-processor.

12. The apparatus as claimed in claim 10, wherein said uni-core processor is a digital signal processor.

* * * * *